United States Patent [19]

Seaver

[11] Patent Number: 5,016,957
[45] Date of Patent: May 21, 1991

[54] PHOTOELASTIC OPTICAL SWITCH AND OPTICAL SYSTEMS EMPLOYING THE OPTICAL SWITCH AND A METHOD OF USE THEREOF

[76] Inventor: George Seaver, 19 Mystery La., Cataumet, Mass. 02534

[21] Appl. No.: 439,710

[22] Filed: Nov. 20, 1989

[51] Int. Cl.[5] .................. G02B 6/10; G02B 6/26; G02B 6/42
[52] U.S. Cl. ...................... 350/96.13; 350/96.14
[58] Field of Search ................. 350/96.10–96.15

[56] References Cited

U.S. PATENT DOCUMENTS

| | | | |
|---|---|---|---|
| 4,684,215 | 8/1987 | Shaw et al. | 350/96.14 |
| 4,735,485 | 4/1988 | Fesler | 350/96.29 |
| 4,792,207 | 12/1988 | Shaw et al. | 350/96.29 |
| 4,793,676 | 12/1988 | Risk | 350/96.13 |

*Primary Examiner*—Akm Ullah
*Attorney, Agent, or Firm*—Richard P. Crowley

[57] ABSTRACT

An optical switch which comprises a photoelastic, optically transparent material whose index of refraction is changed by mechanical stress and which propagates an optical beam or beams from an inlet window to an outlet window in the material, with the inlet window adapted to receive an optical beam from an optical source and the outlet window adapted to pass an optical beam from the photoelastic material to an optical output receptor, and a means of applying a stress gradient to said photoelastic material to change the index of refraction and hence, the optical path of the optical beam between a normal, unstressed optical beam path and a bent, stressed optical beam path. Optical systems are described in which the optical switch is employed to receive an optical beam from a source and to switch a beam after passing it through the photoelastic optical material to and from an optical receptor. The disclosure also includes a method of optically switching an optical beam between normal and stressed optical beam positions by applying a predetermined mechanical force to a photoelastic optically transparent material to form a mechanical stress gradient within the optical transparent photoelastic material which provides an index of refraction gradient therein and causes the switching of the optical beam.

21 Claims, 5 Drawing Sheets

"ON" "OFF"
OPTICAL
BEAM

FIG. 11

PHOTOELASTIC OPTICAL SWITCH AND OPTICAL SYSTEMS EMPLOYING THE OPTICAL SWITCH AND A METHOD OF USE THEREOF

BACKGROUND OF THE INVENTION

Switching a flow of information from one source to another or from one end user to another is an important function of a transmission or computing system. It was the transistor switch which heralded the computer age. In fiberoptic local area networks (LANs) and in fiberoptic sensor systems, the switching of optical beams or waves has not proven to be easy, even for slow speed by-pass applications. The wave or vector nature of photons and the lossy nature of optical interfaces are the reasons. Unlike an electron stream, the beam angle of incidence is an important factor in the transmission of photons through an interface. The presently available techniques for optical switching are: variously complicated, expensive, lossy, confined to a single mode, temperature and enviromentally sensitive, wavelength selective, bulky, slow and require moving parts. Some of the currently available optical switches are: expanded beam/rotating mirror; moving fiber; polarized beam magnetic rotator; traveling acoustic wave; polarized beam liquid crystal rotator; and an electrically operated Lithium Niobate waveguide; while electrically operated organic polymer waveguides are under development.

It is therefore desirable to provide an optical switch, and optical systems employing the optical switch, and a method of optically switching an optical beam from a one to another position to overcome some or all of the disadvantages of the prior art optical switches. In particular, it is particularly advantageous to provide an optical switch which compared with the state of the art switches is simpler and cheaper and usually with lower losses and crosstalk, and which can be used in single or multimode beams, and which can operate over a wide wavelength range, and is solid state, and is environmentally rugged, and is or can be made temperature insensitive.

SUMMARY OF THE INVENTION

The optical switch of the invention is obtained by applying an inhomogeneous stress field to an optically transparent photoelastic material that propagates an optical beam. The non-uniform refractive index distribution thus formed creates a gradient index that changes the direction of propagation and, subsequently, the output position or angle of the optical beam traveling through the material. This contrasts with the conventional photoelastic technique which relies on the anisotropy of the stress field to change the polarization direction of the optical throughput. In the latter case, the inhomogeneous character of the stress field must be negligible, and the stress gradient must be smaller than the stress anisotropy. In the case of an optical switch the stress gradients must be comparable to the anisotropy, and for both polarizations to be switched the anisotropy must be small.

The present invention relates to a photoelastic optical switch, to optical systems employing the optical switch, and to a method of optically switching an optical beam path from one to another position in a simple, easy and effective manner.

The optical switch of the invention comprises an optical switch for altering and changing the path of an optical beam or beams from one to another position and which optical switch comprises a photoelastic optically transparent material which is in slab or fiber form whose index of refraction changes with mechanical stress and which optically transparent material has an inlet window adapted to receive an optical beam from an optical source and an outlet window adapted to pass an optical beam from the optically transparent material to an optical receptor, the optically transparent material permitting the optical beam to pass between the inlet window and the outlet window. The optical switch also comprises means, such as electrical or mechanical means, to apply a predetermined force or bending moment to the photoelastic, optically transparent material in order to form a stress gradient in said photoelastic material, which stress gradient changes the index of refraction of said material so as to form an index of refraction gradient within the material which alters the path of the optical beam passing through the optical material, and therefore changes the beam in the outlet window from an unstressed, normal optical beam path to a stressed, bent optical beam path, thereby providing for a change in position and/or angle between the stressed and unstressed optical beam paths.

The invention comprises also an optical system which includes the optical switch and which includes one or more optical beam sources to provide for one or more optical beams to be placed on the inlet window and which includes optical receptors or non-receptors or a combination of receptors and non-receptors positioned to receive or not to receive in an optimum manner an optical beam emerging from the outlet window.

The method includes the method of switching one or more optical beams between the first and second outlet position, which method comprises providing an optically transparent photoelastic material with an index of refraction changing with stress and having an inlet window and an outlet window and introducing an optical beam into the inlet window from an optical source, passing an optical beam from the outlet window to an optical receptor or non-receptor and applying a predetermined bending moment or force to the photoelastic optically transparent material to form a stress gradient within the optically transparent photoelastic material which changes the index of refraction to form an index of refraction gradient, thereby switching the optical beam issuing from the outlet window between a zero stress and a stressed beam position or angle and thereby providing for the optical switching of an optical beam between a first and second position.

The optical switch is dependent upon which photoelastic optical material is used to fabricate the switch, particularly the slab portion. In one embodiment both polarizations are switched, whereas, in another, only one polarization is switched. The difference lies in the molecular physics of the materials used and the resultant degree of anisotropy of the local stress field. If materials such as quartz or polycarbonate plastic are used as the optical material, only the polarized component parallel to the stresses are switched. If plexiglass, i.e. acrylic, or styrene plastic is used, both polarizations are switched. In order to apply a stress gradient to the optical material, it is customary to apply a bending moment to the switch in a plane perpendicular to the optical path, which then sets up a large bending stress gradient in the plane of bending. The beam deflection also occurs in this plane. For a large bending moment arm-to-thickness ratio of the switch, the amplification of the external force or pressure used to set up the internal stress is large. This amplification goes as the square of the thickness, and the beam displacement goes as the cube of this quantity according to:

$$\text{Maximum stress} = 6M/L\, d^2 \quad (1)$$

$$\text{Beam Displacement} = 12LMC/d^3 \quad (2)$$

where C is the photoelastic constant; d is the thickness; M is the bending moment; L is the optical path length.

The important parameters of the optical switch are the switch material, e.g. quartz, plexiglass, polystyrene, polycarbonate, the applied stress, and particularly the switch thickness, d.

The photoelastic optically transparent material can be in a variety of forms, but typically is in the preferred slab-type form, either square or rectangular, with the stress applied simply by finger pressure or by mechanical levers or by piezoelectric or other techniques to apply a bending moment to the optically transparent photoelastic material.

For example, one method of applying this stress is piezoelectrically. Two thin plates of quartz of opposite piezoelectric polarity sandwich the photoelastic material, and when electrically activated, a bending moment and stress gradient is imposed on the switch. This approach has the added advantage of a potential megahertz response rate, depending upon the switch material and size.

The optical switch may be employed in a variety of optical systems. By using appropriate shaped switches and other means, such as point forces, to concentrate and shape the stresses, various stress fields and beam displacements can be realized. In general we can have an optical lens, whose focal properties and focal axis are made variable by varying the applied forces. Solid state switching of large multimode beams is possible and specifically, the optical switch can be used to provide default routes in a fiberoptic local area network. It can also be used to sense bending stress in a material, such as in a pressure window in an underwater vehicle. This can be accomplished by measuring the ratio of the intensities of the signals in the "on" and "off" switch output ports as the beam is deflected from one to the other. The switch can also be used to normalize a sensor that operates with a polarized input, such as a photoelastic birefringent pressure sensor, by an on-command removal of the first polarizer in order to provide a reference signal output.

The invention will be described for purposes of illustration only in connection with certain preferred embodiments; however, it is recognized that various changes, modifications, improvements and additions may be made to the optical switch, optical systems and methods as described by the applicant, all falling within the spirit and scope of the invention.

DESCRIPTION OF THE EMBODIMENTS

Figure 1:
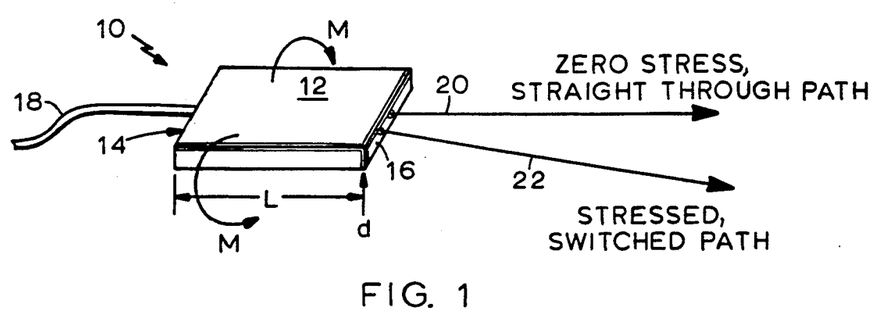
FIG. 1 is a schematic, illustrative view of the basic optical switch of the invention.

In FIG. 1 the principle of the photoelastic optical switch is illustrated. FIG. 1 shows an optical switch 10 comprising a generally rectangular slab of photoelastic transparent material 12, such as plexiglass, having an inlet window 14 at the one end and an outlet window 16 at the other and opposite end. An optical beam guided in an optical fiber 18 is incident on the inlet window and passes through the optical material 12 and out an outlet window 16 and such path is known as the normal, unstressed optical beam 20. The bending moment M is applied to the optical material 12 to create a gradient stress and gradient index of refraction within the material 12 so as to provide for the movement of the normal, unstressed optical beam 20 to a stressed optical beam 22 as illustrated in FIG. 1. For example, the optical material 12 may comprise a one-inch wide, two-inch long, one-eighth inch thick plexiglass plate material that is subject to a bending induced stress from finger pressure and will produce an angular beam displacement of about two degrees experimentally or about two beam diameters at the outlet window, 16 as illustrated in FIG. 1. In another example, a one-inch wide, one millimeter thick optically transparent quartz plate that is subject to a bending induced stress of 3700 psi has an angular beam displacement from the normal unstressed path of about one degree experimentally.

Figure 2:
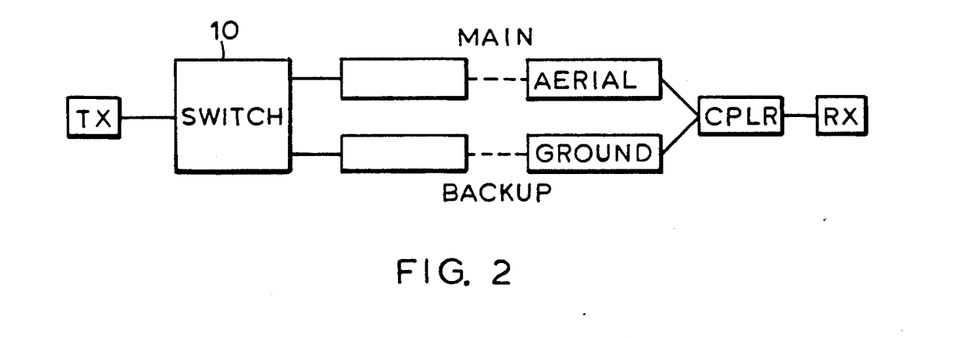
FIG. 2 is a schematic, illustrative view of the optical switch of FIG. 1 in an optical system providing a back-up optical fiber transmission line for a communications system.

FIGS. 2–5 show various applications of the optical switch of the invention as illustrated in FIG. 1 in the fields of fiberoptic telemetry and communications. In these and other applications, the optical switch can be operated locally and manually or by electrically operated solenoids or piezoelectric plates controlled locally or at a central computer station. The optical systems illustrated in FIG. 2 are applications of fiberoptic transmission links where it is desirable to have a back up or fallback line wherein the optical switch is employed. FIG. 2 illustrates a system which employs an optical transmitter TX transmitting an optical beam to a switch 10 which then directs the beam to a main or a back up transmission line and then through a coupler CPLR, and hence to a receiver RX with the optical switch providing for the transmitter to move between the main and the back up line as desired, such selection accomplished by applying a bending moment to the optical switch to provide for a zero stress or a stressed optical beam path.

Figure 3:
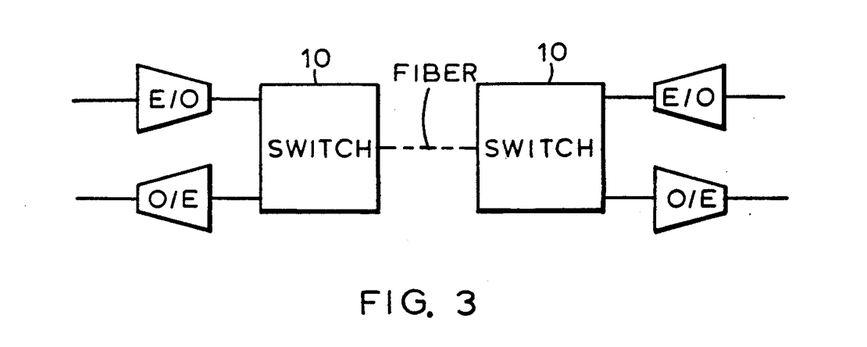
FIG. 3 is a schematic, illustrative view of the optical switch of FIG. 1 in an optical system which allows two-way communication on a single optical fiber.

FIG. 3 illustrates a bi-directional optical communications system which shows two optical switches 10 connected to a single fiber line so as to allow bi-directional communications by initially configuring the switches so that an electric-to-optic transmitter E/O is coupled to one end and an optical-to-electrical O/E receiver is coupled to the other end; then both switches are changed to the stressed condition whereby the first end is now an O/E receiver and the other end becomes an E/O transmitter.

Figure 4:
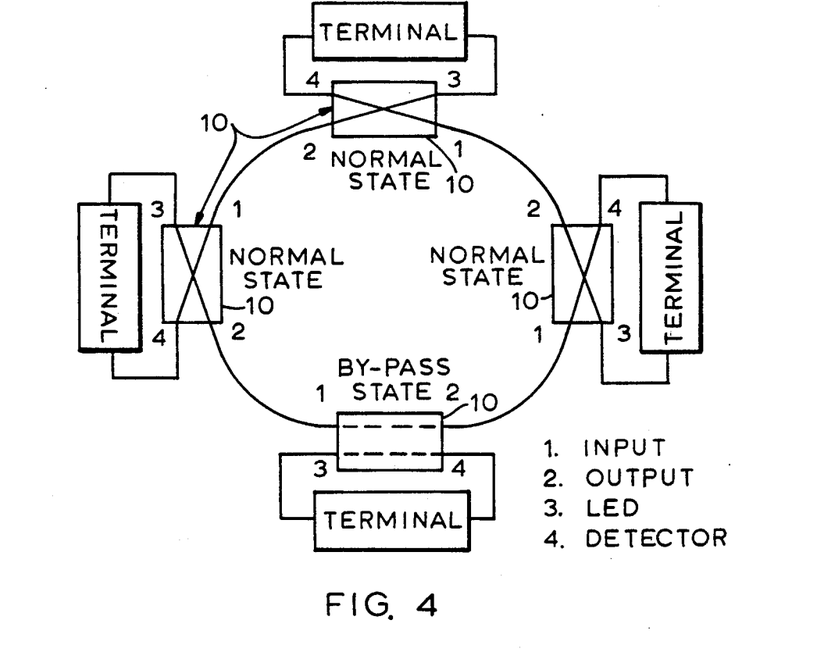
FIG. 4 is a schematic, illustrative view of the optical switch of FIG. 1 that permits normal and by-pass configuration for terminals in a fiberoptic local area network.

FIG. 4 is a schematic illustration of by-pass switching in a token-ring local area network employing optical fiber communications. The optical switch 10 in the token ring allows normal and by-pass configurations of the individual terminals. In the by-pass mode, the terminal is removed from the optical loop. This bypass or "crossback" configuration is achieved by using two optical switches, such as those illustrated in FIG. 1, with the "on" fiber of the first switch coupled to the "off" fiber of the second switch and "on" fiber of the second switch coupled to the "off" fiber of the first switch.

Figure 5:
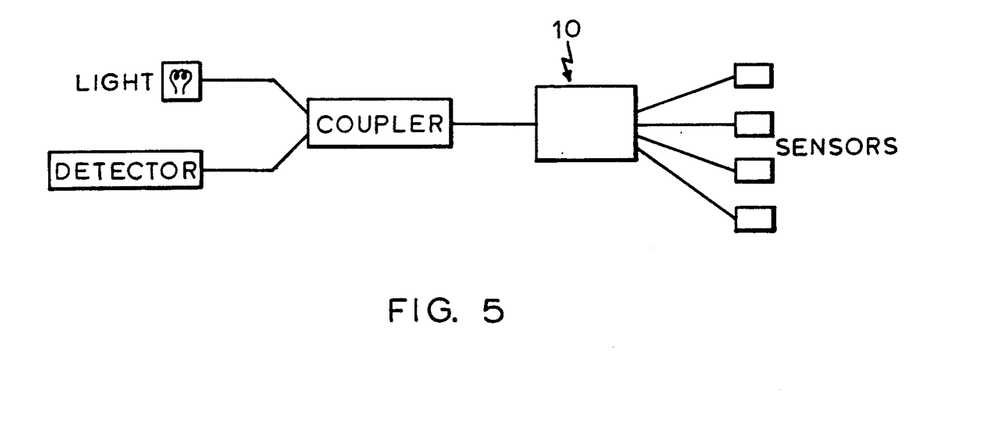
FIG. 5 is a schematic, illustrative view of the optical switch of FIG. 1 in an optical system which allows several sensors to be serviced by a single optical fiber.

FIG. 5 is a schematic illustration of an optical system which shows the optical switch 10 of FIG. 1 employed in an optical system with four instead of two output fibers, which switch is used to couple a light source and a detector to four optical sensors in a sequential manner based upon the amount of bending moment applied to the optical switch 10.

Figure 6A:
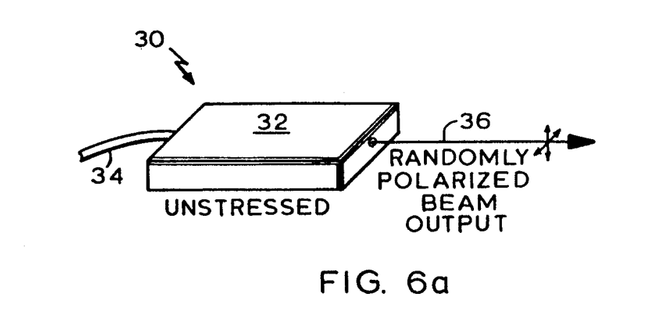
FIGS. 6a and 6b are a schematic, illustrative view of the optical switch of FIG. 1 in an optical system when operated as a polarizing switch by using fused quartz as the photoelastic material.
Figure 6B:
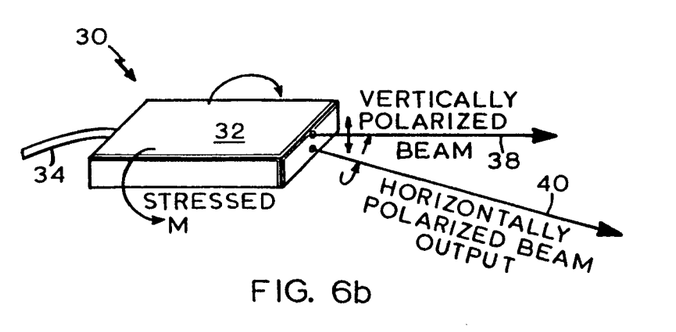

FIG. 6 is a schematic, illustrative view of an optical switch 30 of the invention shown in FIG. 6(a) in the unstressed condition and composed of a fused quartz plate material 32 having an input fiber 34 and with a randomly polarized, unstressed beam path output 36. Shown in FIG. 6(b) is the optical switch 30 in a stressed condition with the randomly polarized beam input 34 wherein the stress gradient deflects the horizontal polarization of the beam to output path 40 and allows the vertical polarization to pass through virtually undeflected to output path 38.

Figure 7A:
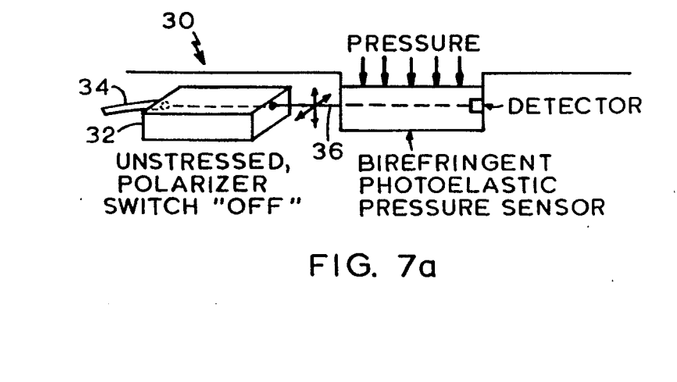
FIGS. 7a and 7b are a schematic, illustrative view of the optical polarizing switch of FIG. 6 used to normalize a photoelastic birefringent pressure sensor when the switch is in the "off" position and to allow sensing when in the "on" position.
Figure 7B:
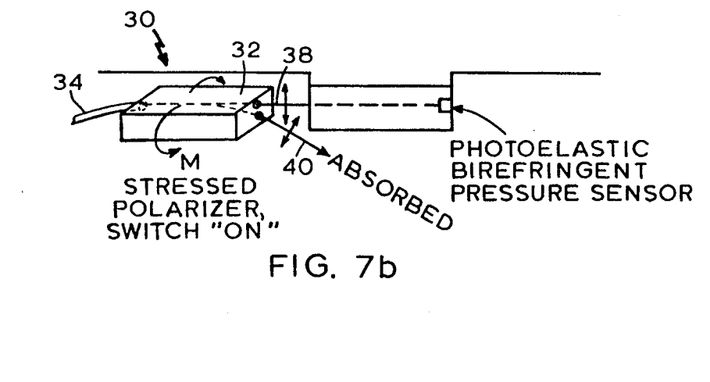

FIG. 7 is a schematic, illustrative view of a photoelastic, birefingent pressure sensor employing the polarization optical switch 30 of FIG. 6. The switch 30 acts as a polarizer to the input beam 34 to the pressure sensor and, with a conventional polarizer after it, the sensor then measures the pressure external to the sensor. FIG. 7(a) shows the sensor in a reference state, where FIG. 7(b) shows the sensor in a measurement state. In FIG. 7(a), the polarizer switch 30 is unstressed and in an "off" position so that with the first polarizer absent, the beam passes through the sensor unaffected by pressure. Because light sources can drift with time, this provides a means of continually normalizing the sensor output by simply periodically removing the force and bending moment from the first polarizer. FIG. 7(b) shows a photoelastic birefringent pressure sensor in the measurement condition with the optical switch stressed, and the output beam 38 to the pressure sensor now polarized.

Figure 8A:
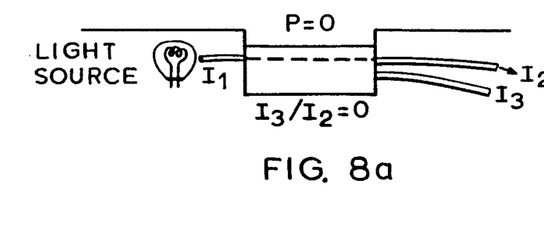
FIGS. 8a and 8b are a schematic, illustrative view of the optical switch of FIG. 1 when employed as a pressure and bending stress sensor.
Figure 8B:
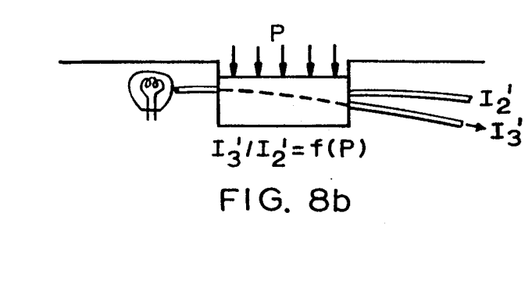

FIG. 8 is a schematic, illustrative view wherein the optical switch itself is used as a pressure and bending stress sensor, and the "on" and "off" outlet fibers on the outlet window are placed close enough together so that the output intensity continuously decreases in the "off" or upper fiber as the intensity in the "on" or lower fiber continuously increases along with the pressure and bending stress, and the ratio of "on" to "off" fiber intensities gives a drift-free and sensitive measure of pressure. FIG. 8(a) shows the switch in a zero pressure state while FIG. 8(b) shows the switch in a elevated pressure state.

Figure 9A:
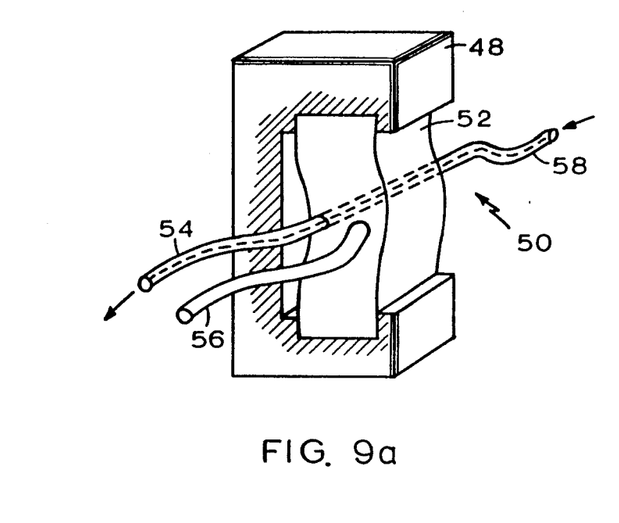
FIGS. 9a–9d are a schematic, illustrative view which shows a method of applying a bending moment to the optical switch of FIG. 1 and which finger pressure changes the bending moment of the swtich from concave to convex or the reverse.
Figure 9B:
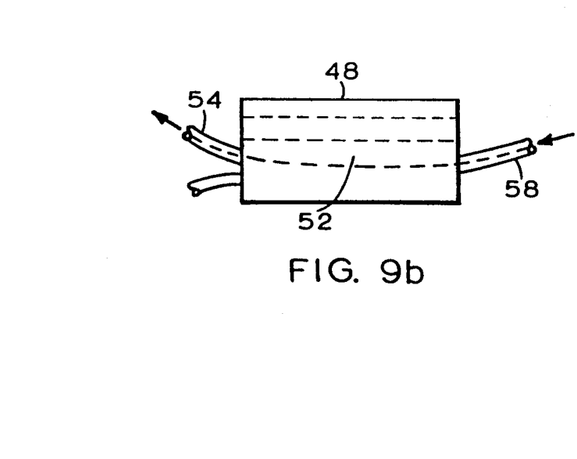
Figure 9C:
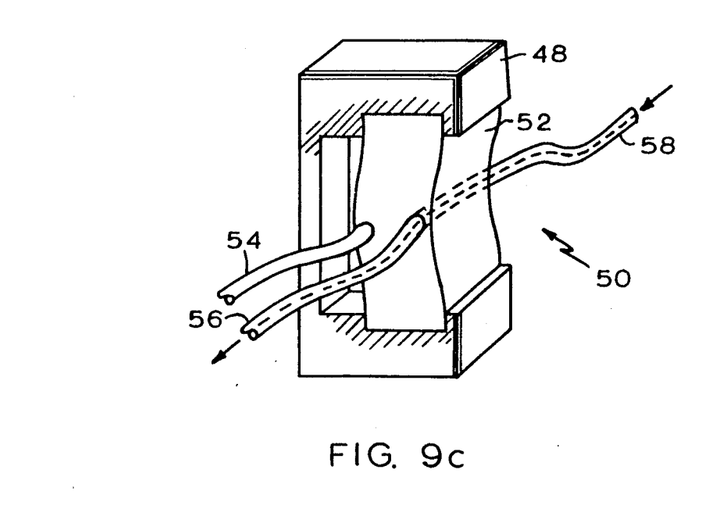
Figure 9D:
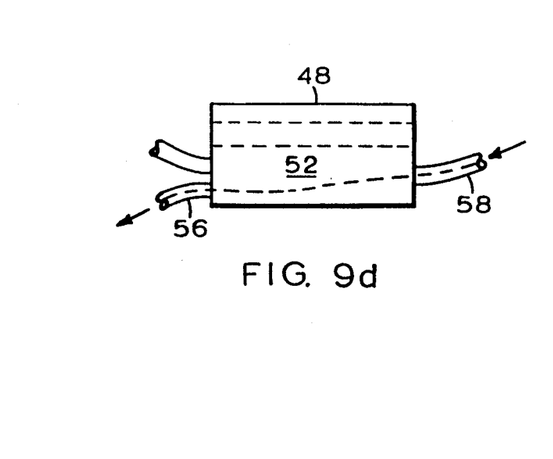

FIG. 9 is an illustrative, schematic view of a manually operated photoelastic optical switch of the invention 50 wherein FIG. 9(a) is a side view of the switch in the "on" position, and FIG. 9(b) is a top view of the switch in the "on" position. FIG. 9(c) is a side view of the switch in the "off" position, and FIG. 9(d) is a top view of the switch in the "off" position.

FIG. 9 shows a casing 48 for a snap-actuated optical swtich and shows the optical switch 50 having a photoelastic transparent material 52 in a casing 48 and having two output fibers 54 and 56 and input fiber 58 from an optical source. As illustrated more particularly by FIGS. 9(c-d), the photoelastic material may be actuated or switched by finger pressure on the photoelastic material 52. Thus, FIG. 9 shows a manual method of applying the bending moment to the photoelastic transparent material 52 of an optical switch in which finger pressure alters the bending from concave to convex or the opposite, thereby reversing the bending stress from tension to compression or from compression to tension. By this operation, the optical switch switches the beam of the input fiber 58 to the output fiber 54 or to 56; this actuation technique is the familiar cricket-type technique found in children's toys.

Figure 10:
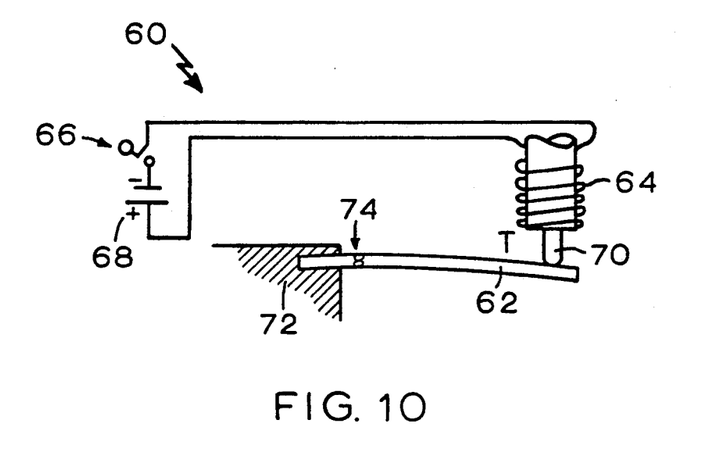
FIG. 10 is a schematic, illustrative view of an optical switch in a system to compensate the optical switch for temperature changes.

FIG. 10 is a schematic, illustrative view of an optical system which illustrates a remotely operated solenoid method of applying a bending moment to an optical switch which is compensated for temperature changes. FIG. 10 shows a system 60 composed of a slab of plexiglass as a photoelastic transparent material 62 secured at the one end by a holder 72. At the other end of the photoelastic switch material 62 there is a plastic arm 70 within a solenoid 64, which arm expands with temperature, and which solenoid is connected by an electrical switch 66 to an electric power source 68, and which swtich has an optical beam 74 passing perpendicularly through the photoelastic material 62. The photoelastic material 62 made of plexiglass has a photoelastic constant C in equation 2 that changes about one percent per degree centigrade. FIG. 10 illustrates a temperature compensation technique in which the arm 70 expands with temperature to apply an increasing displacement or force and bending stress to the optical switch 62 with increasing temperature. The increase in stress on the photoelastic material 62 is designed to compensate exactly for the decrease in the constant C caused by the increase in temperature thereby providing for a temperature-compensated optical switch.

Figure 11:
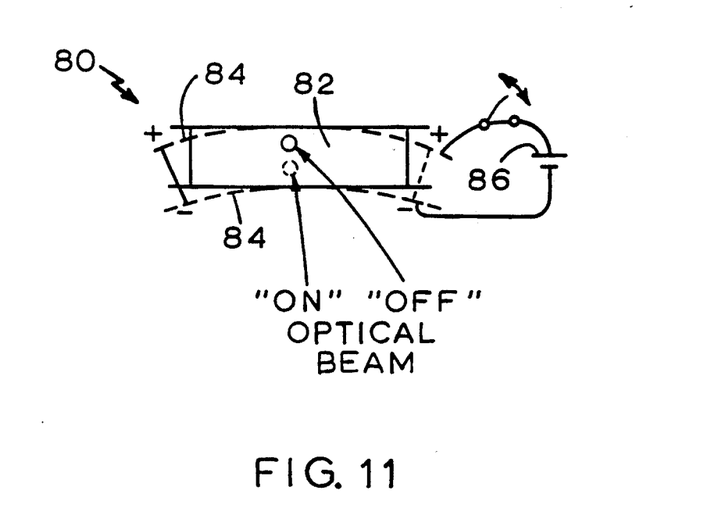
FIG. 11 is a schematic, illustrative view of an optical switch of the invention when the stress is applied by piezoelectric techniques.

FIG. 11 is a schematic, illustrative view of a piezoelectric operated optical switch of the invention 80 showing the switch in the "off" or unstressed position in solid lines and in the "on" or stressed position in dotted lines, and wherein the switch includes a pair of piezoelectric thin plates 84, for example of quartz of opposite piezoelectric polarity, applied on either side of the photoelastic transparent material 82. These piezoelectric plates provide, on the application of an electrical voltage from the source 86, a tension-compression bending moment to the photoelastic material 82, and thereby cause the transparent material to move from an "off", zero stress position to an "on", stressed position. The piezoelectrically-operated switch 80 operates by electrically expanding the top piezoelectric plate 84 and contracting the bottom plate 84 so that the bending moment is applied to the optical switched material 82. This bending moment can be reversed at a rate of kilohertz to megahertz depending upon switch material and size.

When a stress is applied to an optical material, the resultant strain causes the index of refraction, that is, the speed of light in that material, to change. It is made smaller (light speed is increased) under tension, and larger under compression. In a bending condition, such as is shown in FIG. 1, the upper part of the material is under tension, and the lower part is under compression. If an optical beam or wave propagates through this stress field, then the upper part of the wave front travels faster than the lower part, and the wave front pivots and heads off at an angle to its original direction, as shown in FIG. 1. The degree of directional change is dependent upon the relation between the index change and the applied stress (the photoelastic constant, C), the applied force and bending moment, and the distance over which the stress and index change (the thickness of the material).

An optical wave has two polarizations, each perpendicular to the other and to the direction of travel of the wave. In some materials, such as plexiglass and polystyrene plastic, both polarizations are deflected by the stress and index of refraction gradient, as shown in FIG. 1 and FIG. 8. In other materials, such as fused quartz and polycarbonate plastic, the polarization in the direction of the stress is deflected by the stress gradient and the polarization perpendicular to the stress experiences little or no deflection as shown in FIG. 6.

What is claimed is:

1. An optical switch for altering the path of an optical beam, which optical switch comprises:
   (a) a photoelastic, optically transparent material having a defined thickness and whose index of refraction changes with mechanical stress and which optical material has an inlet window adapted to receive an optical beam from an optical source, an outlet window adapted to pass an optical beam from the photoelastic transparent material to an optical receptor, the photoelastic, transparent material permitting an optical beam to pass between the inlet and outlet windows; and
   (b) means to apply a predetermined force to the photoelastic, optically transparent material to form a mechanical stress gradient within such material which changes the index of refraction of said material concurrent with the change in stress gradient to alter the optical beam path of the optical beam and said stress gradient being applied generally perpendicularly to said optical beam path within said transparent material so as to alter the optical beam between an unstressed optical beam path and a stressed optical beam path thereby providing for the change in the output angle and position of the unstressed and stressed optical beam paths from the outlet window.

2. The optical switch of claim 1 wherein the photoelastic, transparent optical material comprises quartz or polycarbonate polymer whereby only the polarized beam component parallel to the applied stresses is substantially deflected.

3. The optical switch of claim 1 wherein the photoelastic, transparent optical material comprises an acrylic or styrene plastic material wherein both the polarized beam components parallel and perpendicular to the applied stresses are deflected the same amount.

4. The optical switch of claim 1 wherein the photoelastic, transparent optical material comprises a slab-type form.

5. The optical switch of claim 1 which includes a means to apply a stress gradient, such as the stress gradient created by applying a bending moment to said photoelastic, transparent optical material in a plane perpendicular to the optical path between the inlet and outlet windows, which stress gradient provides tensile stresses in the upper half of the transparent material and compressive stresses in the lower half of the transparent material.

6. The optical switch of claim 1 where the means to apply a force comprises finger pressure.

7. The optical switch of claim 1 wherein the optical switch includes two thin plates of piezoelectric material of opposite polarity secured to either side of the photoelastic material, whereby on the application of an electrical voltage to the piezoelectric plates, the photoelastic, transparent optical material is subject to a bending moment so as to apply a stress gradient to the photoelastic, transparent optical material.

8. The optical switch of claim 1 wherein the means to apply a force includes means to clamp one end of the transparent material perpendicular to the inlet-outlet windows and thereafter means to apply a force to the other unclamped end of said transparent material, said force being amplified in the strength of the bending stresses by the ratio of the force lever arm to the thickness of the optical material.

9. The optical switch of claim 8 which includes an electrically-operated solenoid having an extending arm therefrom which arm is adapted to apply a force to the unclamped end of the transparent material.

10. The optical switch of claim 1 wherein the means to apply a force includes a pair of quartz piezoelectric plates secured to the top and bottom surfaces of the transparent material and an electric source whereby on the application of an electrical voltage, one of the piezoelectric quartz plates expands and one of the piezoelectric quartz plates contracts thereby applying a bending moment to said switch that is capable of very rapid alteration of direction.

11. The optical switch of claim 10 when used to allow normalizing and sensing, alternatively, of a sensor that requires a polarized input beam to operate, wherein the switch is used in the stressed position to provide the polarized beam for the operation of the sensor, and then in the unstressed configuration to provide the full, unpolarized beam for normalizing the sensed signal.

12. The optical switch of claim 1 which includes an optical beam coupled to the inlet window and wherein said optical beam comprises energy between 500 and 1600 nanometers.

13. The optical switch of claim 1 which comprises a temperature compensating switch which includes a lever means that expands with temperature so as to apply a greater displacement force to the photoelastic, transparent optical material with increasing temperature, which effect cancels the effect of the decrease in the photoelastic constant of the photoelastic, transparent optical material that occurs with the increasing temperature.

14. An optical system which includes the optical switch of claim 1, which optical system also includes:
   (a) an optical source; and
   (b) a single optical fiber extending from the optical source to the inlet window and a plurality of optical fibers placed closely together and adjacent in the outlet window, wherein the means to apply a force is by exposing the upper external surface of the photoelastic, transparent optical material to an unknown pressure, which pressure partially deflect the beam from the first outlet fiber and towards the second fiber, the ratio of the optical intensities coming out of the two outlet fibers then indicating the amount of pressure acting on the switch external surface.

15. An optical system which includes the optical switch of claim 1 and wherein the means to apply the force is an electric means and which system also includes an optical source and an optical fiber terminal which receives the stressed optical beam from the outlet window of the switch, and upon the loss of electrical power to the terminal and switch, the optical switch changes into the unstressed position to provide a bypass of said terminal.

16. An optical system which includes the optical switch of claim 1 and which includes a plurality of input fibers to direct optical beams into the inlet window and where the optical beams from the outlet window are coupled to a plurality of outlet fibers, the exact alignment depending upon the degree of applied force and stress gradient in the transparent optical material.

17. An optical system which includes the optical switch of claim 1 and which includes an optical transmitter to provide an optical beam to the inlet window of the switch, and two output fibers from said switch which constitute a main and back up transmission line to a receiver via a coupler, the application and removal of a bending moment to said switch then causing the system to switch between a main and back up transmission line.

18. An optical system which includes two optical switches of claim 1 with an optical fiber transmission line connecting the inlet windows of each switch, and the two outlet fibers of each switch connected to an optical transmitter and receiver, respectively, thereby permitting one optical transmitter to be connected with the other optical receiver and by causing the switches to select the other output position, reversing the transmitter/receiver pairs, thus allowing bi-directional optical communications.

19. An optical system which includes the optical switch of claim 1 and which includes an optical source and a detector and a coupler between the optical source and detector to provide an optical beam on the inlet window and a plurality of sensors to receive as desired an optical beam between the stressed and unstressed positions from the outlet window.

20. An optical system which includes the optical switch of claim 1, and which includes an optical source and an input fiber from the optical source to the input window of said switch and two output fibers from the outlet window of said switch, and a means to switch the optical beam transiting the switch between the output fibers by the application of an applied force to the photoelastic, transparent optical material.

21. The optical switch of claim 2 in which a plurality of input fibers can be coupled to a plurality of output fibers, depending upon the applied stress gradient, which also includes "crossback" operation in which the plurality of stressed state "on" output fibers are coupled to the opposite unstressed "off" position output fibers.

* * * * *